United States Patent [19]

Rowas

[11] 3,921,050

[45] Nov. 18, 1975

[54] PROGRAMMED BATTERY CHARGING SYSTEM

[75] Inventor: Clifford A. Rowas, Cincinnati, Ohio

[73] Assignee: Schauer Manufacturing Corporation, Cincinnati, Ohio

[22] Filed: Oct. 2, 1974

[21] Appl. No.: 511,318

[52] U.S. Cl. .................... 320/19; 320/21; 320/38
[51] Int. Cl.² ........................................ H02J 7/00
[58] Field of Search ........................ 320/14–21, 320/2–5, 37, 38, 43; 307/41

[56] References Cited
UNITED STATES PATENTS

| | | | |
|---|---|---|---|
| 2,977,525 | 3/1961 | Medlar | 320/21 X |
| 3,796,940 | 3/1974 | Mauch et al. | 320/14 |

FOREIGN PATENTS OR APPLICATIONS 1,222,279  2/1971  United Kingdom.................. 307/41

Primary Examiner—J. D. Miller
Assistant Examiner—Robert J. Hickey
Attorney, Agent, or Firm—Walter S. Murray

[57] ABSTRACT

A circuit controlling a battery charging system adapted to progressively boost charge a succession of banks of series connected, newly manufactured batteries, said circuit including a stand-by switch means adapted to periodically initiate the battery charging system whereby to maintain all the batteries in satisfactory charged conditions for the ultimate users thereof.

3 Claims, 1 Drawing Figure

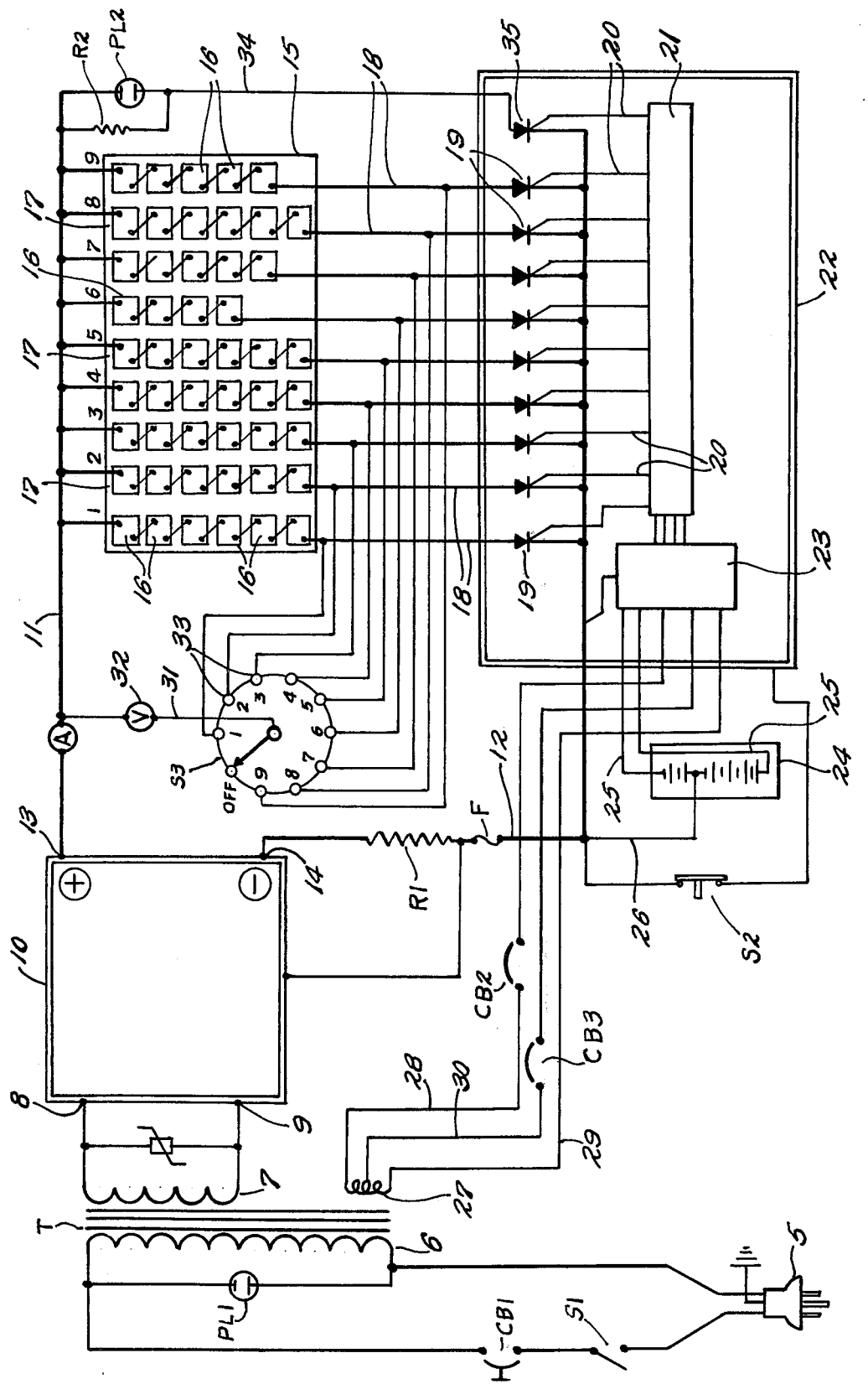

PROGRAMMED BATTERY CHARGING SYSTEM

The present invention relates to battery chargers and is particularly directed to a system for periodically boost charging batteries to effectively maintain stand-by charges in newly manufactured electro-chemical batteries stored in warehouse, distributor or jobber inventories, or in retail sales outlets, such as service stations, automotive dealers and stores, and the like.

It has been known that electro-chemical batteries lose some of their charge between the time they are activated and when they are put into use, the decrease in charge being in part due to the elapsed shelf period and/or to some extent the circumambiant temperature conditions during that period.

It is, therefore, the principal object of the invention to provide an automatic stand-by system that maintains one or a plurality of new electro-chemical batteries in satisfactory charged conditions for relatively long periods of time pending distribution of the batteries to the ultimate users.

Specifically my invention relates to a fully regulated constant current battery charging system used to successively boost charge a number of battery banks, each bank having a number of battery series connected together; the system being programmed to repeat the boost charge step of the banks at predetermined relatively long time intervals.

Another object of the invention is to provide in a battery charging system having the foregoing characteristics a battery bank series connection manual checkout system to selectively verify the correct series connection of batteries in each separate battery bank.

These and other objects of the invention will be apparent from the following specification when taken in conjunction with the accompanying drawing in which the single figure therein is a schematic diagram of an exemplary embodiment of my invention.

With reference to the drawing the charger system is designed to operate from a 120 volt, 60 cycle source which is most frequently encountered in practise and introduced to the system through grounded line plug 5 in turn connected to the primary winding 6 of a transformer T; a master switch S1 and a manual reset circuit breaker CB1 being wired in series in the line. A pilot light PL1 is shunted across the primary winding of the transformer to indicate that the transformer is operative.

The secondary winding 7 of the transformer T is connected to the input terminals 8 and 9 of a fully regulated A/C to D/C, solid state converter 10, which, ideally provides a constant current of 4 amperes in main charging circuit lines 11 and 12 connected to the output terminals 13 and 14, respectively, of the converter 10.

A suitable frame 15 is adapted to removeably hold one or a plurality of lead acid, 12 volt, 6 cell batteries 16 arranged in banks 17, each bank containing a number of the batteries 16 that are series connected together. The positive lead terminal of each battery bank 17 is connected to the main charging line 11, while the negative lead terminal of each battery bank 17 is connected by an individual conductor 18 to the main charging circuit line 12. Each individual line 18 has a controlled rectifier 19 interposed therein poled to normally preclude the flow of current from the main charging circuit through its connected bank of batteries.

The controlled rectifiers 19 are individually and progressively fired and to breakdown because of the potential introduced thereto through conductors 20 and thereby connect each battery bank 17 to the charging circuit, the conductors being connected to a control unit 21 of a programmed sequencer 22. A power unit 23 operates the control unit 21 and is actuated by a center tapped memory battery assembly 24 connected to the power unit by conductors 25—25. The center tap is connected by a line 26 to the main charging circuit line 12. The power unit is also connected to a center tapped secondary winding 27 of the transformer T by terminal lines 28 and 29 and a center line 30, the lines 28 and 30 having automatic reset circuit breakers CB2 and CB3, respectively, interposed therein. The programmed sequencer is connected to a manual, normally closed momentary reset switch S2 to provide a means of resetting the automatic sequenced system back to the initial condition of charging the first bank of batteries.

A series connected manual checkout switch S3 has its arm connected to the main line 11 by conductor 31 with a voltmeter 32 interposed therein, the taps 33 of the switch each connected to an individual conductor 18 of each bank 17 of series connected batteries 16.

A conductor 34 is shunted across the main circuit lines 11 and 12 and has a controlled rectifier 35 therein which is fired by the sequencer control unit 21 independently of the battery charging controlled rectifiers 19, said conductor having a pilot light PL2 therein with a resistance R2 shunted across its terminals.

OPERATION

When the switch S1 is manually switched to the ON position the charging and timing of the entire battery charging control program is started. In the charging phase of my system the control unit 21 switches the first of the nine battery banks to the charging circuit lines 11 and 12 of the constant current converter 10 for 1 hour to return 4 ampere hours of charge to the first of the nine battery banks 17. At the end of the first hour, the program sequencer 21 functions to disconnect this direct current output circuit from the first bank and connect the second bank of the nine banks to the constant current converter direct current output for 1 hour to return 4 ampere hours to the second of the nine battery banks 17. This 1 hour charging step is progressively continued through each of the remaining battery banks, one at a time, to return 4 ampere hours to each of the remaining battery banks 17.

After the ninth battery charging direct current output circuit and its battery bank 17 has been disconnected the stand-by phase of the system is initiated by the control unit 21 of the programmed sequencer 22 by firing controlled rectifier 35 to start an extended disconnect period which should include an elapsed time of approximately 15 days. At the expiration of said elapsed time of disconnect the control unit 21 will again initiate the first charging phase by connecting the direct current output circuit to the first battery bank to repeat the entire battery charging phase. The foregoing sequence of operations will continue to repeat automatically until such time as the switch S1 is manually switched to OFF position. Upon opening of the normally closed momentary reset button S2 the battery charging program can be stopped and the program reset to connect the first of the nine battery banks to the output circuit of its battery bank 17.

The battery bank series connection manual checkout system provides a manual means of verifying the correct series connection of six batteries in each separate battery bank 17, the check of separate battery banks being made, one bank at a time, by advancing the tap switch S3 and noting the voltmeter reading for each position, a reading above or below the proper setting should be checked for improper series connections or other possible causes before turning the charger ON.

What is claimed is:

1. In a programmed battery charging system the combination of a fully regulated, constant current boost charging circuit, a plurality of banks, each bank having a number of series connected batteries therein, a conductor connecting each bank of batteries to the charging circuit, a series of first switches each interposed in a conductor, a stand-by circuit connected across the charging circuit, a visible indicator means and a second switch interposed in series in the stand-by circuit, and a continuously operable sequence control means adapted to progressively actuate and disconnect each first switch to boost charge successive banks of batteries, then actuate the second switch to monitor a non-charging period of the system and finally initiate the boost charging circuit following the non-charging period.

2. In a programmed battery charging system as set forth in claim 1 wherein all the first switches and the second switch are controlled rectifiers.

3. In a programmed battery charging system as set forth in claim 1 wherein a power unit operates the sequence control means, and a center tapped memory battery assembly is connected to the power unit.

* * * * *